United States Patent
Min

(10) Patent No.: US 9,268,650 B2
(45) Date of Patent: Feb. 23, 2016

(54) STORAGE DEVICE, CONTROLLER, AND NON-TRANSITORY COMPUTER-READABLE RECORDING MEDIUM FOR BACKING UP DATA WITHOUT LOWERING I/O CAPABILITIES

(75) Inventor: Zhongzhong Min, Kawasaki (JP)

(73) Assignee: FUJITSU LIMITED, Kawasaki (JP)

(\*) Notice: Subject to any disclaimer, the term of this patent is extended or adjusted under 35 U.S.C. 154(b) by 301 days.

(21) Appl. No.: 13/600,909

(22) Filed: Aug. 31, 2012

(65) Prior Publication Data

US 2013/0138904 A1    May 30, 2013

(30) Foreign Application Priority Data

Nov. 30, 2011  (JP) ................................. 2011-261812

(51) Int. Cl.
| | |
|---|---|
| G06F 12/00 | (2006.01) |
| G06F 13/00 | (2006.01) |
| G06F 13/28 | (2006.01) |
| G06F 11/14 | (2006.01) |

(52) U.S. Cl.
CPC ........ *G06F 11/1458* (2013.01); *G06F 11/1461* (2013.01); *G06F 2201/84* (2013.01); *G06F 2201/855* (2013.01)

(58) Field of Classification Search
CPC ........... G06F 12/00; G06F 3/06; G06F 11/14; G06F 11/1658; G06F 11/1458; G06F 11/1461; G06F 2201/855; G06F 2201/84
USPC ........... 711/114, 160, 161, 162; 707/999.202, 707/999.204
See application file for complete search history.

(56) References Cited

U.S. PATENT DOCUMENTS

| | | |
|---|---|---|
| 7,529,964 B2 | 5/2009 | Suzuki et al. |
| 7,969,792 B2 | 6/2011 | Park |
| 8,001,344 B2 | 8/2011 | Uchida et al. |

(Continued)

FOREIGN PATENT DOCUMENTS

| | | |
|---|---|---|
| CN | 1916862 A | 2/2007 |
| CN | 101079007 A | 11/2007 |

(Continued)

OTHER PUBLICATIONS

Korean Office Action mailed Dec. 19, 2013 for corresponding Korean Application No. 10-2012-105832, with Partial English-language Translation.

(Continued)

*Primary Examiner* — Sanjiv Shah
*Assistant Examiner* — Shane Woolwine
(74) *Attorney, Agent, or Firm* — Fujitsu Patent Center

(57) ABSTRACT

A storage device including a copy processor that carries out a copying process of storing the copy of the data stored in the copy-source volume into the copy-destination volume; a copying manager that prepares copying related to the copying process and sets the copying process to a stand-by state; an activation manager that sets activation target data representing a target to be activated for the copying process in response to an activation instruction from a superior device; and a copy controller that cancels the stand-by state of the copying process, being set the activation target data for, and causes the copy processor to carry out the copying process. This configuration makes it possible to back up data of multiple copy sessions, ensuring integrity in timing of data to be backed up without lowering the capability of an I/O process.

6 Claims, 12 Drawing Sheets

(56) References Cited

U.S. PATENT DOCUMENTS

| | | |
|---|---|---|
| 8,031,548 B2 | 10/2011 | Jeon |
| 8,331,173 B2 | 12/2012 | Park |
| 2003/0051111 A1* | 3/2003 | Nakano et al. ............ 711/162 |
| 2004/0225612 A1 | 11/2004 | Shimojima et al. |
| 2006/0230074 A1 | 10/2006 | Everhart et al. |
| 2007/0038822 A1 | 2/2007 | Correl |
| 2007/0271431 A1* | 11/2007 | Hwang et al. ............ 711/162 |
| 2007/0277015 A1 | 11/2007 | Kalos et al. |
| 2008/0034176 A1* | 2/2008 | Akutsu et al. ............ 711/162 |
| 2008/0279030 A1 | 11/2008 | Jeon |
| 2009/0207668 A1 | 8/2009 | Park |
| 2011/0242910 A1 | 10/2011 | Park |
| 2012/0198153 A1* | 8/2012 | Fuente et al. ............ 711/114 |

FOREIGN PATENT DOCUMENTS

| | | |
|---|---|---|
| EP | 1460544 | 9/2004 |
| JP | 2004-342050 | 12/2004 |
| JP | 2006-048103 | 2/2006 |
| JP | 2007-334709 | 12/2007 |
| JP | 2008-225699 A | 9/2008 |
| KR | 10-0863015 B1 | 10/2008 |
| KR | 10-0911201 B1 | 8/2009 |
| KR | 10-0956775 B1 | 5/2010 |

OTHER PUBLICATIONS

Korean Office Action mailed Jul. 21, 2014 for corresponding Korean Patent Application 10-2012-105832, with English Translation, 6 pages.

Chinese Office Action mailed on Feb. 28, 2015 for corresponding Chinese Patent Application No. 201210376923.8, with Partial English Translation, 16 pages.

Japanese Office Action mailed Jun. 9, 2015 for corresponding Japanese Patent Application No. 2011-261812, with Partial Translation, 5 pages.

* cited by examiner

| SESSION ID | COPY SOURCE | | COPY DESTINATION | | BC | COPY TYPE | STATUS | ASYNC START | ASYNC RESTART |
|---|---|---|---|---|---|---|---|---|---|
| | LUN | STARTING LBA | LUN | STARTING LBA | | | | | |
| 00 | 00 | 000 | 10 | 000 | 1000 | OPC | READYING | 1 | 0 |
| 01 | 00 | 000 | 11 | 000 | 1000 | OPC | READYING | 1 | 0 |
| 02 | 00 | 000 | 12 | 000 | 1000 | OPC | ACTIVE | 0 | 0 |

STORAGE DEVICE, CONTROLLER, AND NON-TRANSITORY COMPUTER-READABLE RECORDING MEDIUM FOR BACKING UP DATA WITHOUT LOWERING I/O CAPABILITIES

CROSS-REFERENCE TO RELATED APPLICATIONS

This application is based upon and claims the benefit of priority of the prior Japanese Patent Application No. 2011-261812, filed on Nov. 30, 2011, the entire contents of which are incorporated herein by reference.

FIELD

The embodiment discussed herein is related to a storage device, a controller, and a computer-readable recording medium having stored therein a program.

BACKGROUND

A scheme called One Point Copy (OPC) is one of the known methods of backing up data stored in a copy-source volume of a product such as a storage device or a computer. OPC creates data called Snapshot, which contains data to be backed up at a certain time point but which does not contain change after the time point. In other words, OPC is a scheme that backs up the entire data in a copy-source volume to be copied at the time point of the creation of the Snapshot.

For example, if a storage system that executes OPC receives an OPC instruction to execute OPC, the system copies the entire data of a copy-source volume at the time of receiving the OPC instruction.

Then, the storage system stores data that is a copy of the data in the copy-source volume, as the Snapshot at the time of receiving the OPC instruction, into a copy-destination volume. In other words, the copy of the data in the copy-source volume can also be regarded as backup data.

For example, the storage system stores the backup data, which is generated by duplicating the entire copy-source volume, into a copy-destination volume in association with session data containing the time of receiving the OPC instruction and the generation of the data being copied.

Patent Literature 1: Japanese Laid-open Patent Publication No. 2007-334709

However, in the event of issuing an overwrite request for a copy-source volume before a Snapshot of the copy-source volume is created, such a conventional data backup manner in a storage system has a possibility that backup of data before the overwriting is not created.

Accompanying drawing FIG. 12 is a diagram depicting a conventional OPC process. In the example of FIG. 12, the storage system includes volumes 01-04, and 11-14. A first copy session stores a Snapshot of the volume 01 into the volume 11; similarly, a second copy session stores a Snapshot of the volume 02 into the volume 12; a third copy session stores a Snapshot of the volume 03 into the volume 13; and a fourth copy session stores a Snapshot of the volume 04 into the volume 14.

In the example of FIG. 12, an writing request is issued to overwrite data "a" into a region of the volume 01 which region stores data A. Similarly, overwrite requests are issued to overwrite data "b" into a region of the volume 02 which region stores data B; overwrite data "c" into a region of the volume 03 which region stores data C; and overwrite data "d" into a region of the volume 04 which region stores data D.

Snapshots of the respective volumes are created in sequence of the volumes 01, 02, 03, and 04. The example of FIG. 12 assumes that a request (I/O processing request) to write the data "c" into the region of data C in the volume 03 is issued at the timing just before creation of a Snapshot of volume 02.

To begin with, a non-illustrated host device issues a Start command of OPC to the volume 01, and responsively, a Snapshot of the region storing the data A in the volume 01 is stored into the volume 11 as depicted by Arrow A1. After that, the data "a" is written into the region storing the data A in the volume 01 at an I/O processing request (see Arrow A2).

Then, the data "c" is written into the region storing the data C in the volume 03 (see Arrow A3). After that, a Start command is issued to the volume 02, and as depicted by Arrow A4, a Snapshot of the region storing the data B in the volume 02 is stored into the volume 12. Furthermore, the data "b" is written into the region storing the data B in the volume 02 (see Arrow A5).

Then, a Start command is issued to the volume 03, and as depicted by Arrow A6, a Snapshot of the volume 03 is stored into the volume 13. Here, since the data C in the volume 03 is already overwritten with the data "c", a Snapshot of data "c" is stored into the volume 13.

As the above, although the storage system intends to create Snapshots of the data A, B, C, and D stored in the volumes 01-04, a Snapshot of the data "c" after the rewriting is created for the volume 03 because a process at the I/O processing request is carried out before a Start command is issued to the volume 03. Consequently, it is difficult to create Snapshots of multiple volumes ensuring integrity of timing of the Snapshots.

As one solution to create Snapshots of multiple volumes ensuring integrity of the timing of Snapshots, it may be proposed that receipt of an I/O processing request is temporarily stopped until processing related to Start commands for all the volumes 01-04 is completed to prevent an I/O process from being executed before a Start command is issued.

However, temporarily stopping receipt of an I/O processing request until processing related to Start commands for all the volumes 01-04 is completed may have a possibility of delaying I/O processes and affecting the operation of the storage device.

SUMMARY

As one aspect, the object of this embodiment is to achieve data backup related to multiple copy sessions ensuring integrity of the timing of data to be backed up.

In addition to the above object, an effect derived from the various configurations of the following embodiment to describe the invention but not achieved by conventional techniques is also regarded as an object of the present invention.

According to an aspect of the embodiment, a storage device including: a copy-source volume that stores data to be copied; a copy-destination volume that stores a copy of the data of the copy-source volume; a copy processor that carries out a copying process of storing the copy of the data stored in the copy-source volume into the copy-destination volume; a copying manager that prepares copying related to the copying process and sets the copying process to a stand-by state; an activation manager that sets activation target data representing a target to be activated for the copying process designated by an activation instruction from a superior device; and a copy controller that cancels the stand-by state of the copying process, being set the activation target data for, and causes the copy processor to carry out the copying process.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Hereinafter, description will now be made in relation to a storage device, a controller, and a computer-readable recording medium having stored therein a program according to an embodiment with reference to the accompanying drawings. However, it should be noted that the following embodiment is an example, and there is no intention to exclude modifications and application of techniques that are not mentioned in the following embodiment and a modification thereof. In other words, the following embodiment and modification can be changed or modified without departing from the concept of the present invention.

Figure 1:
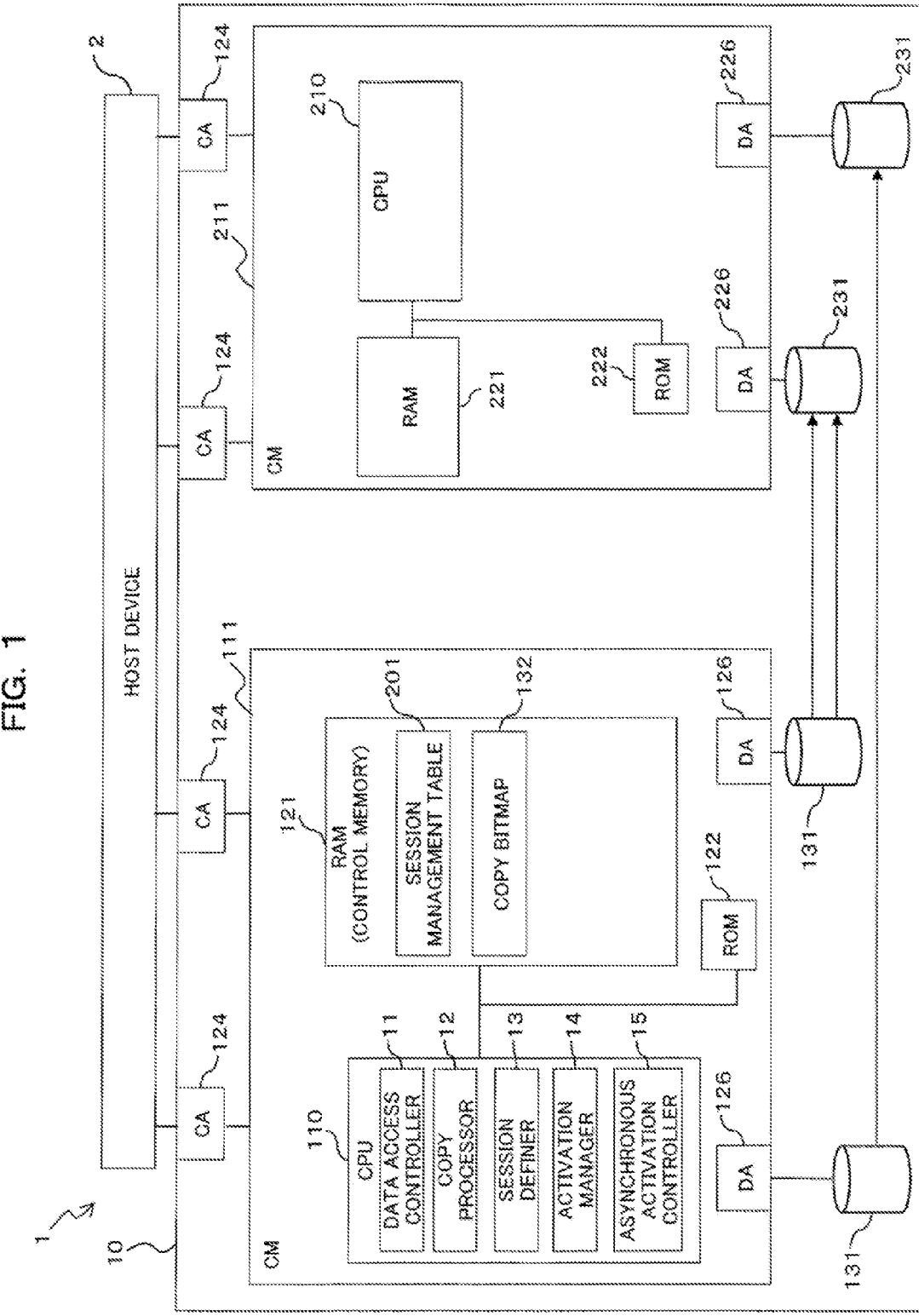
FIG. 1 is a block diagram schematically illustrating an example of the configuration of a storage system according to a first embodiment.
Figure 2:
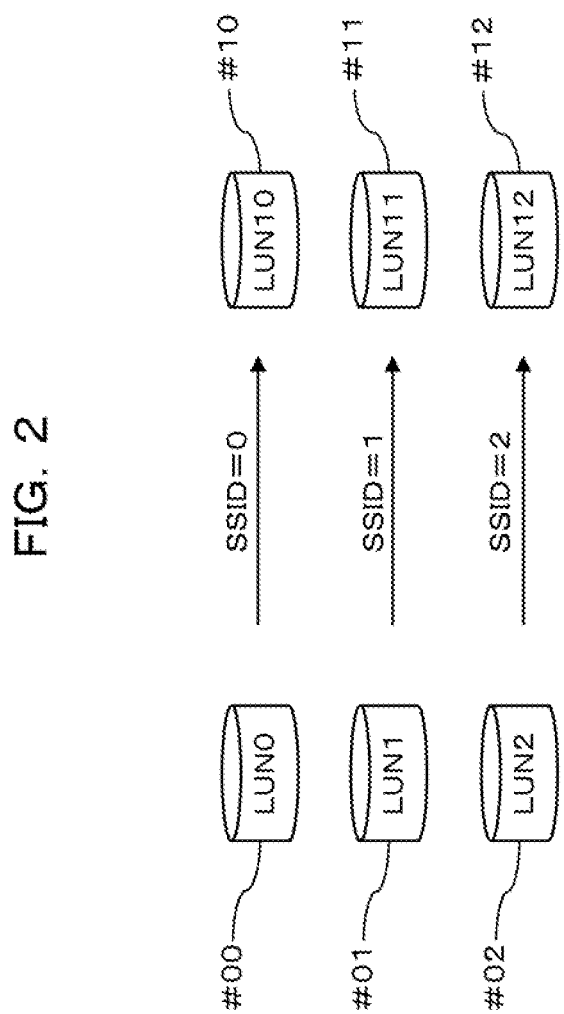
FIG. 2 is a diagram schematically illustrating an example of the volume configuration of a storage device.

FIG. 1 schematically illustrates an example of the configuration of a storage system 1 according to a first embodiment; and FIG. 2 schematically illustrates an example of the volume configuration of a storage device 10.

As illustrated in FIG. 1, the storage system 1, serving as an example of the first embodiment, is connected to a host device 2 serving as a superior device via a non-illustrated communication line.

The host device 2 writes and reads data into and from a volume (logical volume) of the storage device 10 connected thereto. For example, the host device 2 issues an Input/Output (I/O) processing request to read and/or write (i.e., data access request) to the copy source volumes #00-#02 (see FIG. 2) serving as the business volumes of the storage device 10. In response to the I/O processing request, the storage device 10 accesses data in the copy source volumes #00-#02 and then replies to the host device 2.

The host device 2 is an information processor, and is exemplified by a computer equipped with a Central Processing Unit (CPU), a Random Access Memory (RAM), and a Read Only Memory (ROM), which are however not illustrated.

For example, the host device 2 creates session data related to a copy session (copy process) that is to be carried out in the storage device 10.

Session data is related to a copy session, and includes, for example, data pieces of: Session ID; a Logical Unit Number (LUN) and a starting Logical Block Address (LBA) of a copy source; an LUN and a starting LBA of a copy destination; a BC (Block Count); and a copy type.

The session data created by the host device 2 is sent to the storage device 10, and is then stored, as a session management table 201 (see FIG. 3) to be described below, into the RAM 121 or the like of the storage device 10. The session data may be created by any known method.

Furthermore, the host device 2 issues a Concurrent Control Copy command (hereinafter called a CCC command) to the storage device 10 as detailed below. A CCC command is an instruction (activation instruction) that simultaneously makes multiple copy sessions in a Readying state (to be detailed below) into an Active state (to be detailed below), and includes, for example, a Start or Restart command and parameter data (e.g., session IDs) that specifies multiple copy sessions that are to be made into an Active state.

Here, the host device 2 uses a Start command in a CCC command to activate copy sessions at an arbitrary timing while uses a Restart command in a CCC command to activate copy sessions when the storage device 10 is restarted.

The host device 2 has an additional function of creating a backup of each individual volume by issuing a Start or Restart command to the individual volume through a conventional scheme.

The storage device 10 provides a storing region to the host device 2, and is exemplified by a Redundant Arrays of Inexpensive Disks (RAID) device. For convenience, FIG. 1 illustrates the storage device 10 being connected to a single host device 2, but alternatively the storage device 10 may be connected to two or more host devices 2. Alternatively, another storage device may be connected to the storage device 10. Various modifications to the storage system of FIG. 1 can be suggested.

As illustrated in FIG. 1, the storage device 10 includes Controller Modules (CMs) 111 and 211, Channel Adapters (CAs) 124, and disk units 131 and 231. The CMs 111 and 211 carry out various controls in the storage device 10, such as access control to the disk units 131 and 231 in response to an I/O processing request from the host device 2.

The disk units 131 and 231 are exemplified by Hard Disk Drives (HDDs). The CM 111 is connected to one or more (two in the example of FIG. 1) HDDs 131; and the CM 211 is connected to one or more (two in the example of FIG. 1) HDDs 231. In the storage device 10, the storing regions of the HDDs 131 and 231 are assigned to logical volumes. The number of HDD 131 connected to the CM 111 and the number of HDD 231 connected to the CM 211 can be variously modified.

In the example of FIG. 2, the storage device 10 includes six logical volumes (hereinafter simply called volumes) LUN0-LUN2 and LUN10-LUN12: the LUN0-LUN2 are allocated to the HDD 131 and the LUN10-LUN12 are allocated to the HDD 231. Hereinafter, the LUN0-LUN2 are sometimes called volumes #00-#02, respectively, and the LUN10-LUN12 are sometimes called volumes #10-#12, respectively.

This storage system 1 has a function of data copying that copies data in one volume into another volume in the storage device 10. The first embodiment will describe an example assuming that data in the volumes #00-#02 connected to the CM 111 are copied into the volumes #10-#12 connected to the CM 211. This means that the volumes #00-#02 are copy-source volumes and the volumes #10-#12 are copy-destination volumes. For the above, the volumes #00-#02 may sometimes be referred to as copy-source volumes; the volumes #10-#12 may sometimes be referred to as copy-destination volumes; and data copying may sometimes be referred to as data transfer or data backup.

For example, the copy-source volumes #00-#02 are business volumes that store business data of the host device 2, and are updated by data writing based on an I/O processing request from the host device 2. In this storage system 1, data stored in the copy-source volumes #00-#02 in the storage device 10 is to be copied for backup.

The copy-destination volumes #10-#12 are used as backup-destination volumes (local backup) of the copy-source volumes #00-#02 in the storage device 10. In other words, data (copy-source data) of the copy-source volumes #00-#02 are stored as backup data into the copy-destination volumes #10-#12, respectively.

A CA 124 is an interface controller that communicably connects the CM 111 or 211 to the host device 2, and is exemplified by a fiber-channel adaptor. For example, a CA 124 receives an instruction of copying data in the storage device 10, which instruction is input by an operator into the host device 2. Also, a CA 124 receives an I/O processing request for the volumes #00-#02 from the host device 2.

The DAs 126 and 266 are interface controllers that communicably connect the CMs 111 and 211 to the HDDs 131 and 231, respectively, and are exemplified by fiber-channel adaptors, SCSI adaptors, or iSCSI adaptors.

As illustrated in FIG. 1, the CM 111 is an information processor including the CPU 110, the ROM 122, and the RAM 121; and the CM 211 is an information processor including the CPU 210, the ROM 222, and the RAM 221. In the first embodiment, the CM 111 manages the copy-source volumes #00-#02, and the CM 211 manages the copy-destination volumes #10-#12.

The RAMs 121 and 221 are memories (memory regions) that temporarily store various pieces of data and programs. Predetermined regions of the RAMs 121 and 221 temporarily store data received from the host device 2 and data to be sent to the host device 2, and therefore function as buffer memories.

Further, when the CPUs 110 and 210 to be detailed below are to execute programs, relevant data and programs are temporarily stored and expanded in other regions of the RAMs 121 and 221. In addition, still another region of the RAM 121 stores a session management table 201 that is to be detailed below.

Another region of the RAM 121 stores a copy bitmap 132 that is to be detailed below.

The above pieces of data that are stored separately in respective regions in the RAMs 121 and 221 may alternatively be stored in respective memory devices. The manner of storing these pieces of data can be modified appropriately.

The ROMs 122 and 222 are memory devices that store programs and various pieces of data that are to be executed and used by the CPUs 110 and 210, respectively.

The CPUs 110 and 210 are processors that carry out various controls and calculations and achieve various functions through executing programs stored in the ROMs 122 and 222 and others.

As illustrated in FIG. 1, the CPU 110 functions as a data access controller 11, a copy processor 12, a session definer 13, an activation manager 14, and an asynchronous activation controller 15.

The program to achieve the functions of the data access controller 11, the copy processor 12, the session definer 13, the activation manager 14, and the asynchronous activation controller 15 is provided in the form of being stored in a computer-readable recording medium such as a flexible disk, a CD (e.g., CD-ROM, CD-R, CD-RW), and a DVD (e.g., DVD-ROM, DVD-RAM, DVD-R, DVD+R, DVD-RW, DVD+RW, HD DVD), a Blu-ray disk, a magnetic disk, an optical disk, and a magneto-optical disk. The computer reads the program from the recording medium and stores the program into an internal or external memory device for future use. The program may be stored in a storage device (recording medium), such as a magnetic disk, an optical disk, and a magneto-optical disk, and may be provided to a computer from the storage device through a communication path.

The functions of the data access controller 11, the copy processor 12, the session definer 13, the activation manager 14, and the asynchronous activation controller 15 are achieved by a microprocessor (corresponding to the CPU 110 of the first embodiment) executing a program stored in an internal memory device (corresponding to the RAM 121 or the ROM 122 in the first embodiment). Alternatively, a computer may read a program stored in a recording medium and execute the read program.

Here, a computer includes hardware and an Operating System (OS), and means hardware which operates under control of the OS. Otherwise, if a program operates hardware independently of an OS, the hardware corresponds to the computer. Hardware includes at least a microprocessor such as a CPU and means to read a computer program recorded in a recording medium. In the first embodiment, the CMs 111 and 211 serve to function as a computer.

The data access controller 11 accesses data in the copy-source volumes #00-#02 in response to an I/O processing request from the host device 2. For example, when the host device 2 issues an access request (i.e., I/O processing request) for reading and writing data from and into the volumes #00-#02, the data access controller 11 reads and writes data from and into the volumes #00-#02 in response to the I/O processing request.

An I/O processing request received from the host device 2 is enqueued on, for example, a non-illustrated management queue. The data access controller 11 sequentially dequeues an I/O processing request from the management queue in a FIFO (First In, First Out) manner, and carries out corresponding processing to the I/O processing request.

The copy processor 12 forwards a copy of copy-source data stored in each of the copy-source volumes #00-#02 to corresponding one of the copy-destination volumes #10-#12, and stores the respective copies into the copy-destination volumes #10-#12, so that data stored in the copy source volumes can be backed up. In the first embodiment, the copy processor 12 forwards a copy of copy-source data stored in each of the copy-source volumes #00-#02 to corresponding one of the copy-destination volumes #10-#12 in a manner exemplified by OPC, SnapOPC, SnapOPC+, or QuickOPC.

The above manners of backing up data of the copy-source volumes #00-#02 in the OPC are already known, so detailed description thereof is omitted here.

Hereinafter, description will now be made in relation to an example of data forwarding by the copy processor 12 from the copy-source volumes #00-#02 to the copy-destination volumes #10-#12 in the OPC scheme.

One cycle unit of a copying process in such manners as the OPC scheme is called a "session". Hereinafter, a copy processing of storing a copy of data in a copy-source volume into a copy-destination volume is sometimes called a "copy session" or simply a "session".

The copy processor 12 does not execute a copy session a status (to be detailed below) of which is not set to be "Active". Therefore, the copy processor 12 in the storage system 1 also functions as an inhibitor that inhibits a copy session a status of which is not set to be "Active" from being executed.

The session definer (copying manager) 13 prepares copying related to a copy session, and defines the copy session.

For preparing copying related to a copy session, the session definer 13 sets a session ID that identifies the copy session, acquires resources for the copy session, and creates a session management table 201 and a copy bitmap 132, for example.

The acquiring of resources for the copy session is, for example, a reservation for a storing region in a copy-destination volume to store data to be copied. The data about the reserved storing region in the copy-destination volume is stored in the session management table 201. The session ID is identification data that uniquely identifies the corresponding copy session.

A copy session can be defined in any known method using, for example, a Get Session ID command or a Start command. For a copy session related to a restart, a Restart command is used in place of a Start command.

Figure 3:
FIG. 3 is a diagram depicting an example of a session management table of the first embodiment.

FIG. 3 is a diagram depicting an example of the session management table 201 in the storage system 1 of the first embodiment.

The session management table 201 includes management data for managing data related to a copy session. As depicted in FIG. 3, in the session management table 201 a session ID, the LUN and the starting LBA of a copy source, the LUN and the starting LBA of a copy destination, a Block Counter (BC), a copy type, a status, Async Start, and Async Restart are managed in association with one another.

The "LUN of a copy source" is the LUN set for a volume storing data to be copied in the corresponding copy session, that is the LUN set for a volume to serve as a data forwarding source. The "starting LBA of a copy source" is an address representing a starting position of a region to be copied in the corresponding copy session. The "LUN of a copy destination" is the LUN set for a volume to which the data is forwarded in the corresponding copy session, and the "starting LBA of a copy destination" is an address representing a starting position of a region to store the data to be copied in the corresponding copy session. The "BC" represents the size (copy size, block size) of data to be copied in the corresponding copy session.

The "copy type" is a type of the corresponding copy session, and data representing, for example, OPC, SnapOPC, SnapOPC+, or QuickOPC, is set therein. The "status" is a status of the corresponding copy session, and specifically represents the progress of preparing the copying by the session definer 13. Examples of the "status" are "Idle," "Reserve," "Readying," "Active," and "Error/Suspend."

Here, "Idle" represents a status of not executing the corresponding copy session; "Reserve" represents a status of reserving a session ID but not acquiring the resource yet in the preparation of copying by the session definer 13; "Active" represents a status of being executing the copy session (being copied); and "Error/Suspend" represents a status of being incapable of executing the copy session for some reason. For example, if data to be copied is broken or a copy-source or a copy-destination volume can not be accessed, "Error/Suspend" is set in the status.

"Readying" represents a status of completion of reserving a session ID and acquiring the resources in the preparation of copying by the session definer 13. In other words, "Readying" is a status of being capable of executing the copy session but not executing the copy session yet (i.e., stand-by state).

These statuses are occasionally set by the session definer 13 in accordance with the progress of preparing the copying. The session definer 13 also functions as a copying manager that sets a copy processing completed copying preparation to a stand-by state (Readying).

"Async Start" and "Async Restart" are data (activation target data) representing that the corresponding copy session is to be activated by the asynchronous activation controller 15 that is to be described below. In other words, "Async Start" and "Async Restart" are activation target data representing that the corresponding copy session is to be activated. For example, "0" or "1" is set as a flag in each of "Async Start" and "Async Restart". When a flag "1" is set for "Async Start" or "Async Restart", the corresponding copy session is to be activated and, as detailed below, the asynchronous activation controller 15 activates the copy session.

Here, "Async Start" represents that the corresponding copying session is to undergo activation by the asynchronous activation controller 15 at an arbitrary timing; and "Async Restart" represents that the copy session is to undergo the activation when the storage device 10 is restarted.

"Async Start" and "Async Restart" are set in the session management table 201 by the activation manager 14. The activation manager 14 sets "1" in "Async Start" and "Async Restart" for a copy session designated by a parameter of a CCC command received from the host device 2. Specifically, if a received CCC command includes a Start command, the activation manager 14 sets a flag "1" in the "Async Start"; and if a received CCC command includes a Restart command, the activation manager 14 sets a flag "1" in the "Async Restart".

Hereinafter, "Async Start" in the session management table 201 is sometimes called an asynchronous activation flag, and similarly "Async Restart" in the session management table 201 is sometimes called an asynchronous activation flag for restart. Hereinafter, a copy session having an asynchronous activation flag or an asynchronous activation flag for restart being set to "1" is sometimes called an asynchronous activation target copy session.

For example, description will now be made in relation to the copy session having a session ID "00" registered at the beginning of the session management table 201. The copy session having a session ID #00 has a copy type of OPC. This copy session copies 1000-block data which starts from an address LBA "000" in the volume LUN "00" into a region which starts from an address LBA "000" in the volume LUN "10".

As denoted in FIG. 3, the copy session having a session ID "00" is in a status of Readying, and is waiting for activation by the asynchronous activation controller 15. In addition, an asynchronous activation flag "1" is set for the copy session having a session ID "00". In other words, the copy session having a session ID "00" is an activation target of the asynchronous activation controller 15 that is to be detailed below.

The session management table 201 created by the session definer 13 is stored in, for example, the RAM 121.

The copy bitmap 132 is management data related to forwarding statuses among volumes provided in the storage system 1.

The copy bitmap 132 is created by, for example, dividing a copy-source volume into multiple unit regions each of which has a predetermined size (for example, 8 KB) and associating each unit region with data representing whether the data stored in the unit region is forwarded to a copy-destination volume. In other words, the copy bitmap 132 manages progress in status of forwarding data of the copy-source volume #00.

When the storage device 10 has multiple copy sessions, the session definer 13 creates a copy bitmap 132 for each copy session.

Figure 4:
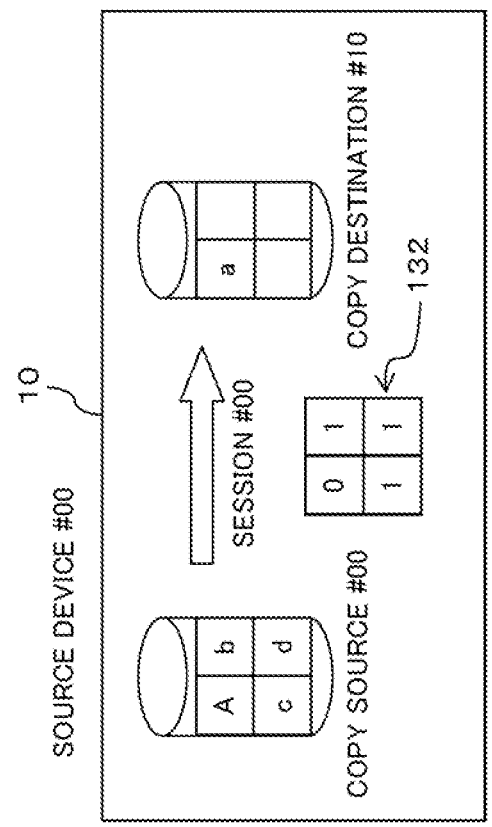
FIG. 4 is a diagram depicting an example of a copy bitmap of a storage system of the first embodiment.

FIG. 4 is a diagram denoting a copy bitmap 132 of the storage system 1 as an example of the first embodiment.

In the example of FIG. 4, the copy-source volume #00 is divided into four regions (segments), so that copy bitmap 132 associates each of the four regions constituting the copy-source volume #00 with data "0" or "1" representing whether forwarding data in the region is completed. For example, data "1" is set for a region data of which is not forwarded yet while data "0" is set for a region data of which is already forwarded and is not to need further copying.

The copy processor 12 refers to the copy bitmap 132 and sequentially copies data in regions each for which "1" representing data in the region is not forwarded yet into a copy-destination volume. In addition, the copy processor 12 sets data "0" for a region in which data forwarding is already completed.

Thereby, whether data in each of multiple regions constituting the copy-source volume #00 is already forwarded can be easily determined by referring to the copy bitmap 132.

The activation manager 14 sets a flag "1" in "Async Start" or "Async Restart" of the session management table 201 concerning a copy session designated by a parameter in a CCC command received from the host device 2. Specifically, upon receipt of a CCC command containing a Start command from the host device 2, the activation manager 14 sets a flag "1" in "Async Start" in the session management table 201 for a copy session designated by the received CCC command. Similarly, upon receipt of a CCC command containing a Restart command from the host device 2, the activation manager 14 sets a flag "1" in "Async Restart" in the session management table 201 for a copy session designated by the received CCC command.

In accordance with a CCC command received from the host device 2, the activation manager 14 sets activation target data (an asynchronous activation flag) representing that the copy session is a target of activation for the copy session designated by the received CCC command.

The asynchronous activation controller 15 changes the status of a copy session associated with "Async Start" or "Async Restart" in which a flag "1" is set in the session management table 201 from "Readying" to "Active". Hereinafter, the term "activation" means changing the status of a copy session from "Readying" to "Active."

In the present storage system 1, the copy processor 12 carries out a copy session confirmed to be associated with an asynchronous activation flag set to be "1" and also status set to be "Active." In other words, the copy processor 12 does not carry out a copy session not associated with status being "Active."

The asynchronous activation controller 15 (copy controller) cancels the Readying status of a copy session associated with an asynchronous activation flag set to be "1" and then sets the status of the copy session to an Active. Thereby, the asynchronous activation controller 15 causes the copy processor 12 to carry out the copying related to the copy session.

The asynchronous activation controller 15 changes the status of the copy session from Readying to Active in the session management table 201.

In the present storage system 1, the asynchronous activation controller 15 activates a copy session at (1) a polling opportunity and (2) an I/O opportunity from the host device 2.

(1) Activation at a Polling Opportunity:

The storage device 10 in the present storage system 1 starts polling every predetermined interval (for example, one second). During the polling, the activation manager 14 refers to an asynchronous activation flag in the session management table 201. The activation manager 14 sequentially changes the statuses of copy sessions each for which an asynchronous activation flag is set to be "1" from Readying to Active.

A succession of procedural steps of the activation at a polling opportunity in the storage system 1 of an example of the first embodiment will now be described with reference to a flowchart (steps A10 through A70) of FIG. 5.

At the start of polling, the asynchronous activation controller 15 sets (selects) a copy session registered at the beginning of the session management table 201 to be a copy session to be processed (step A10).

The asynchronous activation controller 15 determines whether an asynchronous activation flag of the selected copy section is set to be "1" (step A20). If the asynchronous activation flag is set to be "1" (see YES route in step A20), the asynchronous activation controller 15 changes the status of the selected copy session from Readying to Active (step A30). Specifically, the asynchronous activation controller 15 changes the status in the session management table 201.

The asynchronous activation controller 15 changes the asynchronous activation flag of the session from "1" to "0" in the session management table 201 (step A40).

After that, the copy processor 12 carries out a copy session a status of which becomes Active. Specifically, the copy processor 12 refers to the session management table 201, and copies the data in the copy-source volume into the copy-destination volume as defined in the copy session, so that the data is backed up (step A50).

As the above, the copy processor 12 of the present storage system 1 carries out a copy session confirmed to be associated with an asynchronous activation flag set to be "1" and also status set to be "Active."

Then, the asynchronous activation controller 15 confirms whether for all the copy sessions registered in the session management table 201 the procedural steps A20-A50 (step A60) are completed. If for all the copy sessions the procedural steps A20-A50 are not completed (see NO route in step A60), a next session is set (step A70) and the procedure returns to step A20. Conversely, if for all the copy sessions the procedural steps A20-A50 are completed (see YES route in step A60), the procedure ends.

If the asynchronous activation flag of the selected copy session is not set to be "1" (see NO route in step A20), the procedure moves to step A60.

In the event of polling, data pieces specified by one or more copy sessions associated with an asynchronous activation flag set to be "1" in the session management table 201 are simultaneously backed up in the above manner.

Data backup related to copy sessions associated with an asynchronous activation flag set to be "1" is executed at a spontaneous timing of a polling opportunity in the storage device 10 in asynchronization from receipt of a CCC command from the host device 2.

(2) Activation at an I/O Opportunity:

In the present storage system 1, when an I/O processing request for a volume is received from the host device 2 or another element and the volume designated by the I/O processing request overlaps the copy region of a copy session set to be an asynchronous activation target, the copy session of the asynchronous activation target is activated.

Specifically, before data related to a copy session set to be an asynchronous activation target is backed up through polling after the storage device 10 receives a CCC command from the host device 2, the host device 2, or the like, sometimes issues an I/O processing request to the storage device 10. Under the above occasion, if a storing region to be processed at the received I/O processing request overlaps a copy region of a copy session set to be an asynchronous activation target, execution of the I/O processing request is temporarily prohibited. In the meanwhile, the copy session set to be an asynchronous activation target is activated and the data of the region to be processed at the received I/O processing request is backed up. After that, the I/O processing request is carried out.

Figure 6:
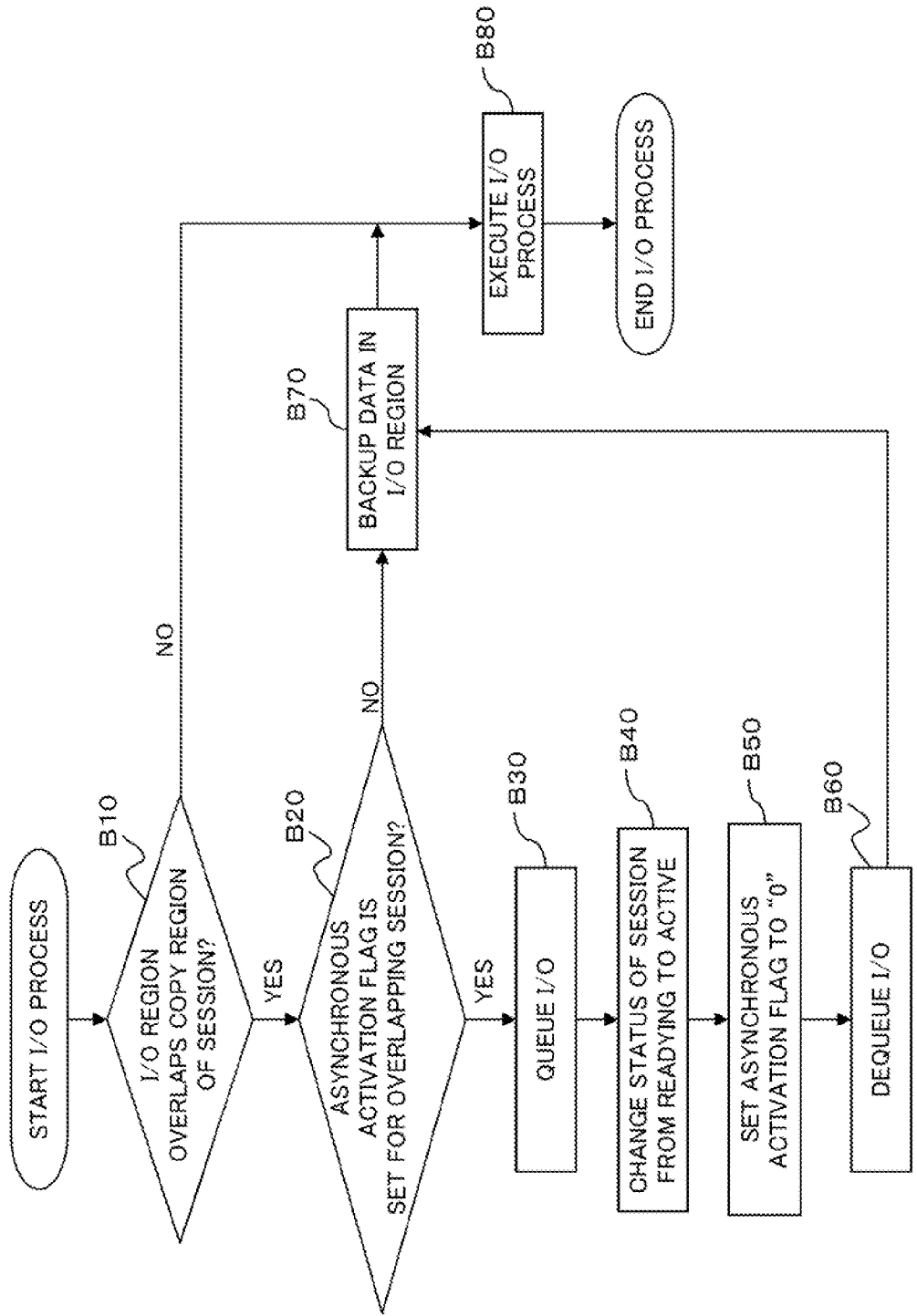
FIG. 6 is a flowchart denoting an example of a succession of procedural steps of activation at an I/O opportunity from a host device in a storage system of the first embodiment.

Activation at an I/O opportunity from the host device 2 in the storage system 1 serving as an example of the first embodiment will now be detailed with reference to a flowchart (steps B10-B80) of FIG. 6.

Upon receipt of an I/O processing request from the host device 2, the CPU 111 of the storage device 10 determines whether a region of a volume which region is to be processed at the received I/O processing request overlaps any one of regions related to copy sessions registered in the session management table 201 (step B10). This determination is based on the values of the LUNs, the LBAs, and the BCs in the session management table 201.

If a region to be processed at the I/O processing request at least partially overlaps a copy region of a copy session (see YES route in step B10), the asynchronous activation controller 15 confirms whether the overlapping copy session has an asynchronous activation flag set to be "1" (step B20).

If the overlapping copy session has an asynchronous activation flag set to be "1" in the session management table 201 (see YES route in step B20), the data access controller 11, for example, queues the I/O processing request into a management queue (step B30). The asynchronous activation controller 15 changes the status of the overlapping copy session from Readying to Active (step B40), so that the copy session comes to be ready for start. Specifically, the asynchronous activation controller 15 changes the status of the overlapping copy session from Readying to Active in the session management table 201.

The asynchronous activation controller 15 sets an asynchronous activation flag of the overlapping copy session to "0" in the session management table 201 (step B50). The data access controller 11 dequeues the I/O processing request from the management queue (step B60).

After that, the copy processor 12 backs up data stored in the region (segment) of the copy-source volume which region is to be processed at the I/O processing request into the copy-destination volume (step B70). Thereby, data of the copy-source volume before undergoing the I/O process is backed up in the copy-destination volume.

The data access controller 11 executes the I/O process following to the I/O processing request dequeued in step B60 (step B80) and ends the procedure.

On the other hand, if a region to be processed at the I/O processing request does not overlap a copy region of a copy session at all (see NO route in step B10), the I/O process from the host device 2 is determined not to access to the copy region of OPC, so that the I/O processing request from the host device 2 is executed in step B80.

If the overlapping copy session has an asynchronous activation flag set not to be "1" in the session management table 201 (see NO route in step B20), a normal OPC is executed by the I/O processing request received from the host device 2. Specifically, the data of the region to be processed at the received I/O processing request is backed up in step B70 and then the I/O process is executed in step B80.

Figure 7:
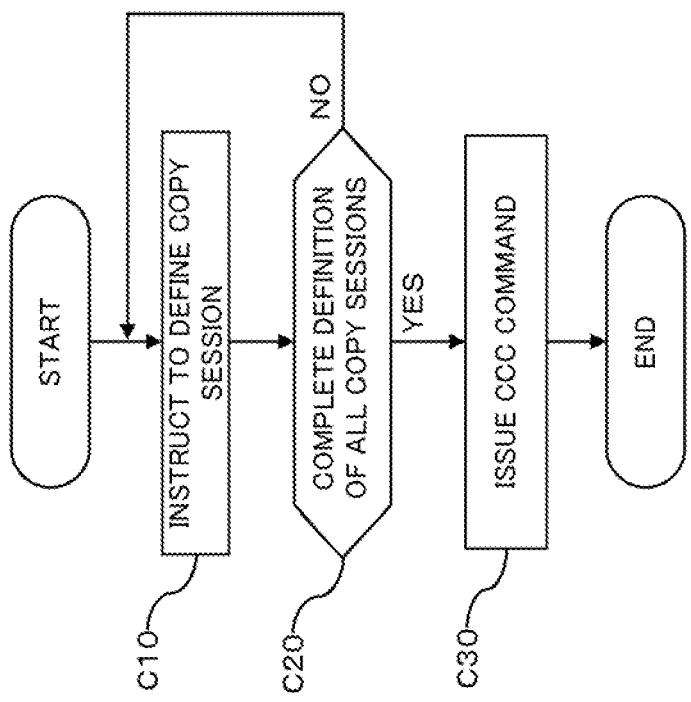
FIG. 7 is a flowchart denoting an example of a succession of procedural steps performed by a host device of a storage system of the first embodiment.

A process to be executed by the host device 2 in the storage system 1 having the above configuration according to the first embodiment will now be detailed with reference to a flowchart (steps C10-C30) of FIG. 7.

The host device 2 executes the following process when the storage device 10 is to be backed up at a particular timing of, for example, just before the start of maintenance of the storage system 1.

To begin with, the host device 2 instructs the storage device 10 to define a copy session (step C10). This instruction of defining a copy session includes, for example, data specifying a region of the copy-source volume and a region of the copy-destination volume which regions are the source and the destination of the forthcoming backup.

Following the instruction of defining a copy session, the session definer 13 in the storage device 10 prepares the copying and defines the copy session. A detailed process of defining a copy session in the storage device 10 will be described below. The session definer 13 changes the status of a copy session that already completes preparation for copying to Readying.

The host device 2 confirms whether definition of all the copy sessions to back up data is completed (Step C20) and repeats step C10 until all the copy sessions are defined (see NO routes in step C20). This means that when multiple copy sessions are defined, the process of step C10 is repeated as many times as the number of the copy sessions.

After completing the definition of all the copying sessions (see YES route in step C20), the host device 2 issues a CCC command to the storage device 10 and thereby instructs to activate the defined copy sessions (step C30). A CCC command contains each session ID as a parameter that designates a copy session to be activated. Each copy session to be activated is specified by the parameter. A process of the storage device 10 when receiving a CCC command will be detailed below.

The storage device 10, which receives the CCC command, replies with a command response to the host device 2, so that the host device 2 comes to be capable of sending an I/O processing request to the storage device 10.

Figure 8:
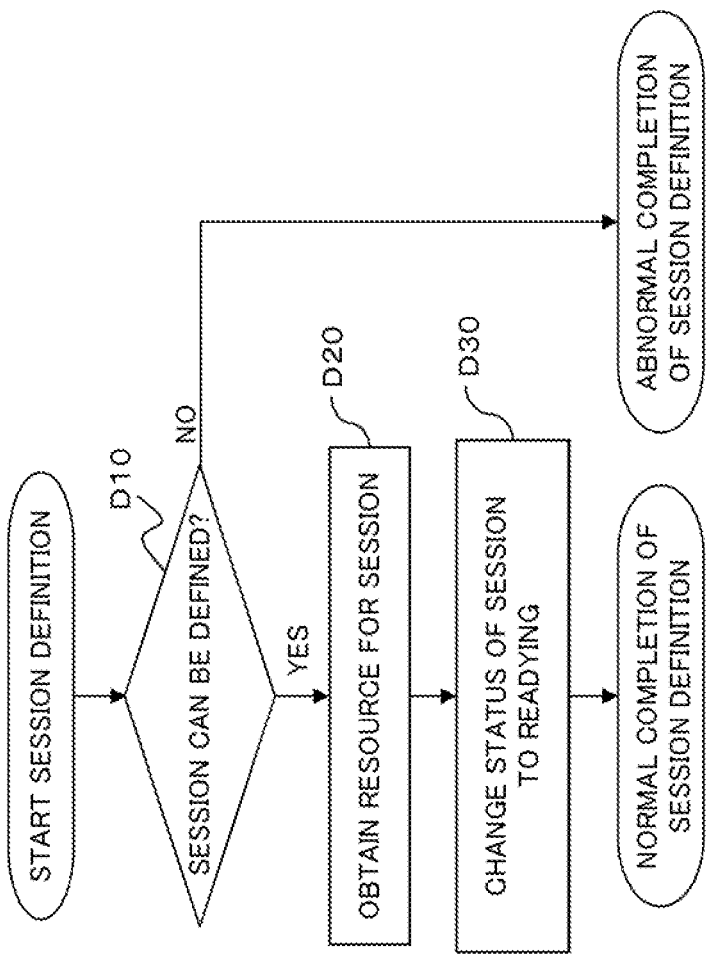
FIG. 8 is a flowchart denoting an example of a succession of procedural steps of session definition by a storage device of a storage system of the first embodiment.
Figure 9:
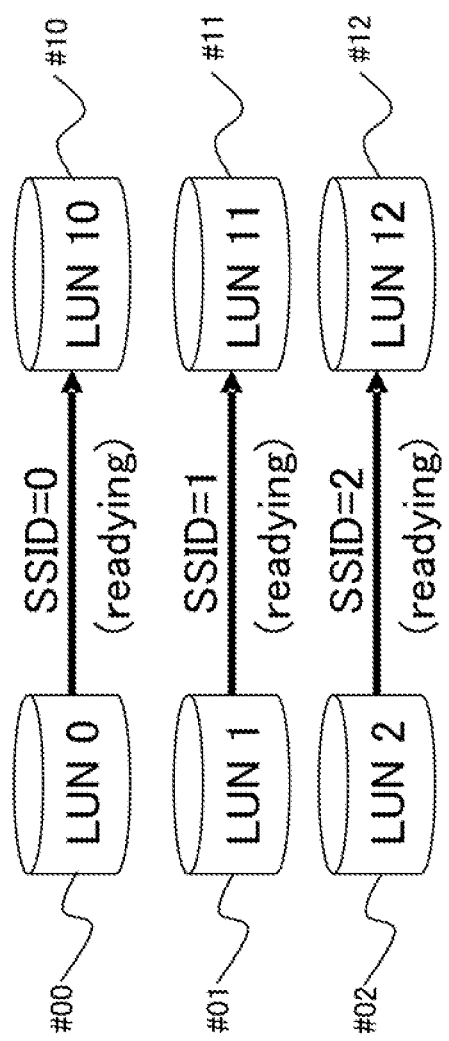
FIG. 9 is a diagram schematically illustrating an example of a volume configuration of a copy session.

Next, defining a session by the storage device 10 of the storage system 1 of an example of the first embodiment will now be described along a flowchart (steps D10-D30) of FIG. 8 with reference to FIG. 9. FIG. 9 is a schematic diagram illustrating an example of a volume configuration concerning copy sessions.

Upon receipt of an instruction of defining a copy session from the host device 2 (see Step C10 in FIG. 7), the session definer 13 of the storage device 10 determines whether the designated copy session can be defined (Step D10). For example, if the designated copy session is not able to be defined for somewhat reasons such as the absence of the designated volume (see NO route in step D10), the session definer 13 ends definition of the copy session due to occurrence of session definition abnormality. The storage device 10 preferably notifies the host device 2 of occurrence of session definition abnormality.

If the designated copy session can be defined (see YES route in step D10), the session definer 13 acquires resource to define the copy session (Step D20) and defines the copy session. Specifically, the session definer 13 reserves a region in the copy-destination volume into which the data to be copied is stored, sets data of the session ID that specifies the copy session, registers the data of the session ID into the session management table 201 (in other words, creates the session management table 201), and creates the copy bitmap 132.

As illustrated in FIG. 9, the session definer 13 then sets the status of the defined copy session to Readying in the session management table 201 (Step D30), and ends the procedure. The storage device 10 notifies the host device 2 of normal completion of session definition.

The example of FIG. 9 assumes that the volumes #00-#02 are copied to the volumes #10-#12, respectively, and depicts the status of the respective copy sessions (SSIDs: 0 through 2) set to be Readying.

Next, a process of the storage device 10 in the storage system 1 as an example of the first embodiment when receiving a CCC command will now be described along the flowchart (steps E10-E30) of FIG. 10 with reference to FIG. 11. FIG. 11 schematically depicts transition in status of copy sessions.

Upon receipt of a CCC command from the host device 2 (see Step C30 in FIG. 7), the activation manager 14 obtains session IDs set in the form of a parameter in the CCC command, and determines whether the statuses of the copy sessions specified by the session IDs can be changed to Active (step E10). The determination is based on confirmation, for example, whether the volumes related to each designated copy session are not broken; whether the HDDs 131 and 231 including the volumes are powered on; and/or whether the motors of the HDDs 131 and 231 are not in the off state due to power-saving setting.

If each of the designated copy sessions is not be able to be activated (see NO route in step E10), the CCC command processing on the designated copy session ends because of occurrence of command anomaly. The storage device 10 notifies the host device 2 of occurrence of CCC command anomaly.

Conversely, if each of the designated copy sessions can be activated (see YES route in step E10), the activation manager 14 sets an asynchronous activation flag (Async Start) of the copy session to "1" in the session management table 201 (step E20).

After that, the activation manager 14 confirms whether asynchronous activation flags of all the copy sessions designated by the received CCC command are set to "1" (step E30). If asynchronous activation flags of all the copy sessions designated by the received CCC command are set to "1" (see YES route in step E30), the procedure ends for normal completion of the CCC command. The storage device 10 notifies the host device 2 of normal completion of the CCC command.

In the example of FIG. 11, the statuses of the copy sessions (SSIDs=0 through 2) are changed from Readying to Active, and then copying starts.

If asynchronous activation flags of all the copy sessions designated by the received CCC command are not set to "1" yet (see NO route in step E30), the procedure returns to step E20.

Figure 10:
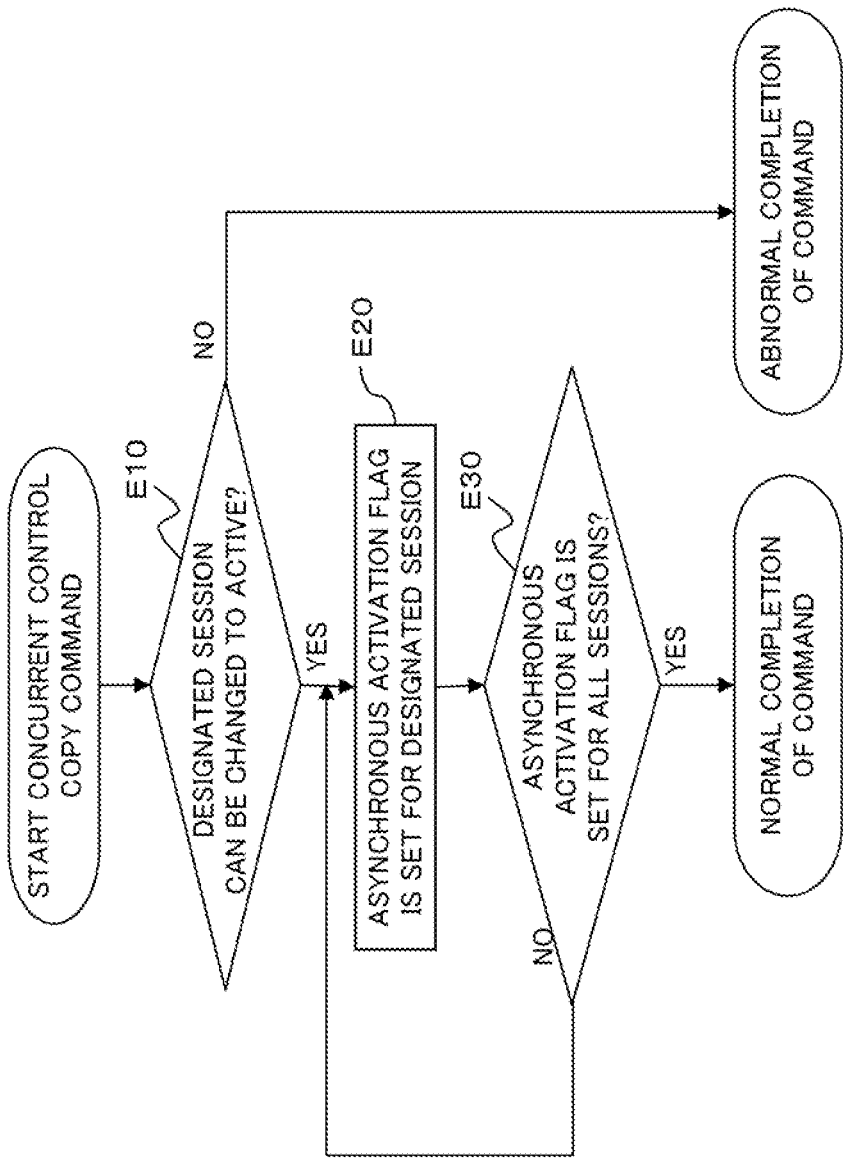
FIG. 10 is a flowchart schematically illustrating an example of a succession of procedural steps performed by a storage device of a storage system according to a first embodiment when receiving a CCC command.
Figure 11:
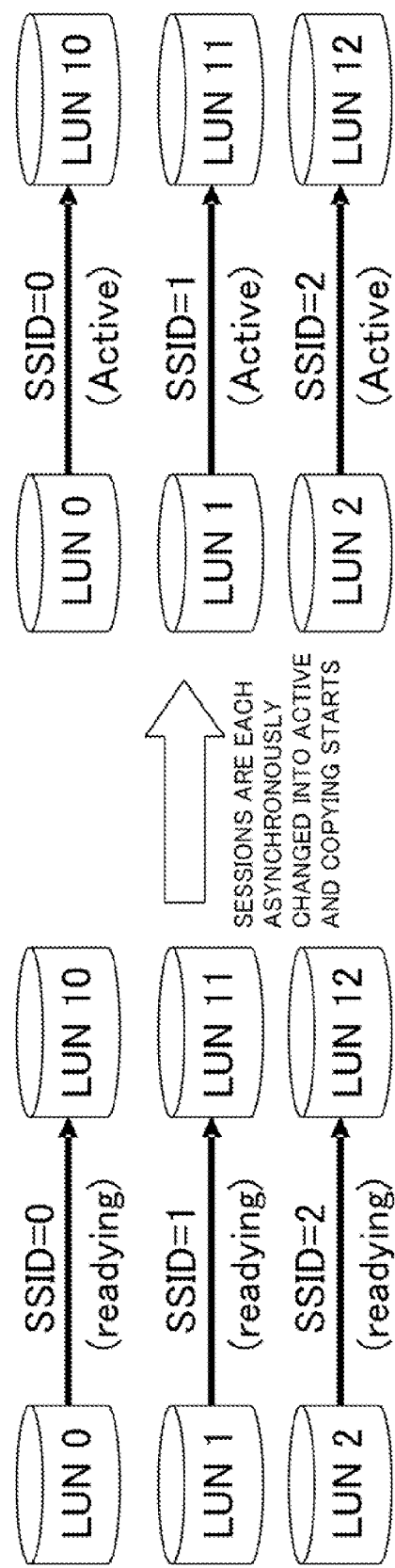
FIG. 11 is a diagram schematically depicting transition in status of copy sessions.
Figure 12:
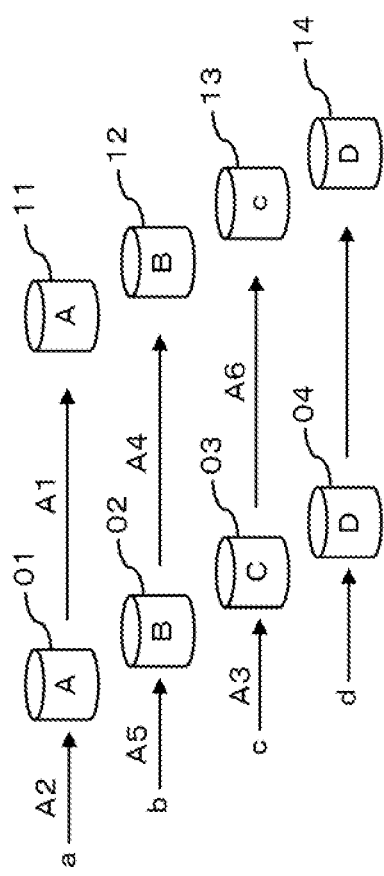
FIG. 12 is a diagram depicting a conventional OPC processing.

When the storage device 10 is restarted, the same procedure as this CCC command processing of FIG. 10 is executed except that the activation manager 14 sets an asynchronous activation flag (Async Restart) for restart of an designated copy session to "1" in the session management table 201 in the step corresponding to step E20.

As the above, in the storage system 1 serving as an example of the first embodiment, the session definer 13 defines multiple copy sessions and then sets the statuses of the copy sessions to Readying, and the activation manager 14 sets an asynchronous activation flag for an designated copy session, following a CCC command sent from the host device 2. After that, the asynchronous activation controller 15 activates each copy session having an asynchronous activation flag set to be "1" at a spontaneous timing in polling, so that data backup related to the designated copy session starts.

The above procedure makes it possible to carry out a copying process including multiple copy sessions designated by a CCC command in a short time. Since a copying process including multiple copy sessions can be executed in a short time, it is possible to reduce the possibility that an I/O processing request is input during execution of a backup copying process. Furthermore, data related to multiple copy sessions can be backed up almost at the same timing.

Comparing with a conventional scheme that involves receiving a Start command from a host device 2 and repeating backup of a volume designated by the Start command, the copy processor 12 can reduce time spent on executing a backup copying process including multiple copy sessions.

Even if an I/O processing request is received during execution of a backup copying process, if a region to be processed at the received I/O processing request overlaps a copy region of a copy session having an asynchronous activation flag set to be "1", the corresponding I/O process is executed after creating a backup of the overlapping copying region. In other words, if a storing region to be processed at the received I/O processing request overlaps a copy region of a copy session set to be an asynchronous activation target, the asynchronous activation controller 15 temporarily halts execution of the I/O processing request. During the halt, the copy session set to be an asynchronous activation target is activated and the overlapping copy region is backed up. Then, the I/O processing request is executed.

Thereby, a backup of a copy-source volume in a state before the I/O process is executed can be surely created, so that the backup for multiple volumes can ensure integrity of the timing of data to be backed up without lowering the capability of the I/O processing.

Various changes and modifications can be suggested without departing from the spirit of the first embodiment.

For example, the storage device 10 of the first embodiment includes the single CM 111 that manages the copy-source volumes and the single CM 211 that manages the copy-destination volumes, but this embodiment is not limited to this. Alternatively, the storage device 10 may include three or more CMs 111 and 211 in total. In other words, the storage device 10 may include multiple CMs 111 that manage the copy-source volumes and/or multiple CMs 211 that manage the copy-destination volumes. Another modification can also be adopted.

Furthermore, the storage device 10 of the first embodiment includes six logical volumes LUN0-LUN2 and LUN10-LUN12, and the volumes #00-#02 are copied to the volumes #10-#12, respectively. However, the first embodiment is not limited to this configuration of the volumes. The configuration and the number of copy-source volumes and/or copy-destination volumes may be appropriately changed.

In the above first embodiment, the copy processor 12 forwards data stored in the copy-source volumes #00-#02 to the copy-destination volumes #10-#12 through an OPC scheme, but data forwarding is not limited to this. Alternatively, data backup may be carried out in another scheme, such as SnapOPC, SnapOPC+, or QuickOPC.

In the above first embodiment, data related to each copy session is managed in the form of the session management table 201, but the data management is not limited to this. Alternatively, various pieces of data as denoted in FIG. 3 may be managed in association with one another in the form except for a table.

Figure 5:
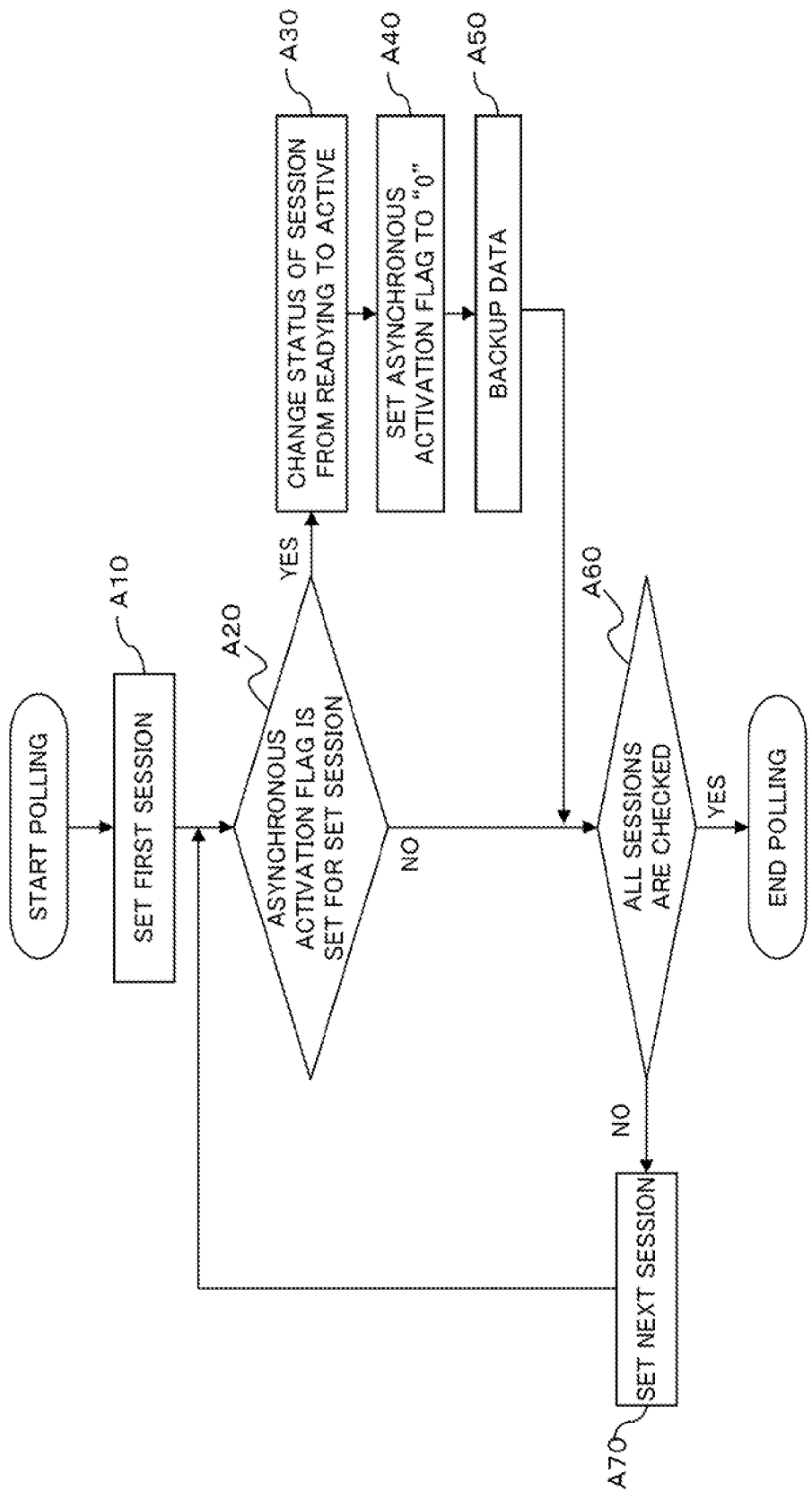
FIG. 5 is a flowchart denoting an example of a succession of procedural steps of activation at a polling opportunity in the first embodiment.

Furthermore, while activation is being executed during polling as denoted in FIG. 5, a process related to an I/O processing request received from an external device of the storage device 10 may be temporarily stopped. Thereby, backing up of a volume accompanied by the polling can be preferentially executed, so that data related to multiple copy sessions can be backed up, ensuring the integrity of timing of data to be backed up.

The storage system 1 can shorten the time that the copy processor 12 takes to execute a backup copying process including multiple copy sessions. This advantage makes it possible to abate tie-up of processes performed at I/O processing request even if the processes are temporarily stopped during the activation in the polling.

Those ordinarily skilled in the art can carry out and manufacture the first embodiment from the above disclosure.

The technique disclosed herein can achieve data backup related to multiple copy sessions, ensuring integrity in timing of data to be backed up without lowering the capability of an I/O process.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage device comprising:
   a copy-source volume that stores data to be copied;
   a copy-destination volume that stores a copy of the data of the copy-source volume;
   a copy processor that carries out a copying process of storing the copy of the data stored in the copy-source volume into the copy-destination volume;
   a copying manager that prepares copying related to the copying process and sets the copying process to a stand-by state;
   an activation manager that sets activation target data representing a target to be activated for the copying process, of copy processes set to the stand-by state, designated by an activation instruction from a superior device;
   a copy controller that cancels, at a time of receiving a data access request for the copy-source volume overlapping a region of the copying process, being set the activation target data for, which the timing is asynchronous to the activation instruction, the stand-by state of a plurality of the copying process, being set the activation target data for, to activate the plurality of copying processes, and simultaneously causes the copy processor to carry out the plurality of copying processes; and
   a data access controller that queues, upon receipt of a data access request for accessing the copy-source volume overlapping the region of the copying process, being set the activation target data for, the data access request,
   wherein, after copying data stored in the region of the copy-source volume, the region being to be accessed at the data access request, into the copy-destination volume by the copy processor, the data access controller dequeues the data access request and accesses data corresponding to the data access request.

2. The storage device according to claim 1, wherein, at a timing of executing a polling by the storage device which the timing is asynchronous to the activation instruction, the copy controller cancels the stand-by state of a plurality of the copying processes, being set the activation target data for, to activate the plurality of copying processes and simultaneously causes the copy processor to carry out the plurality of copying processes.

3. A controller device that controls storing a copy of data stored in a copy-source volume into a copy-destination volume, the controller device comprising:
   a copy processor that carries out a copying process of storing the copy of the data stored in the copy-source volume into the copy-destination volume;
   a copying manager that prepares copying related to the copying process and sets the copying process to a stand-by state;
   an activation manager that sets activation target data representing a target to be activated for the copying process, of copy processes set to the stand-by state, designated by an activation instruction;
   a copy controller that cancels, at a time of receiving a data access request for the copy-source volume overlapping a region of the copying process, being set the activation target data for, which the timing is asynchronous to the activation instruction, the stand-by state of a plurality of the copying process, being set the activation target data for, to activate the plurality of copying processes, and simultaneously causes the copy processor to carry out the plurality of copying processes; and
   a data access controller that queues, upon receipt of a data access request for accessing the copy-source volume overlapping the region of the copying process, being set the activation target data for, the data access request,
   wherein, after copying data stored in the region of the copy-source volume, the region being to be accessed at the data access request, into the copy-destination volume by the copy processor, the data access controller dequeues the data access request and accesses data corresponding to the data access request.

4. The controller device according to claim 3, wherein, at a timing of executing a polling which the timing is asynchronous to the activation instruction, the copy controller cancels the stand-by state of a plurality of the copying processes, being set the activation target data for, to activate the plurality of copying processes and simultaneously causes the copy processor to carry out the plurality of copying processes.

5. A non-transitory computer-readable recording medium having stored therein a program for causing a computer to execute control of storing a copy of data stored in a copy-source volume into a copy-destination volume, the control comprising:
   preparing copying related to a copying process of storing the copy of the data stored in the copy-source volume into the copy-destination volume;
   setting the copying process to a stand-by state;
   setting activation target data representing a target to be activated for the copying process, of copy processes set to the stand-by state, designated by an activation instruction;

cancelling, at a time of receiving a data access request for the copy-source volume overlapping a region of the copying process, being set the activation target data for, which the timing is asynchronous to the activation instruction, the stand-by state of a plurality of the copying process, being set the activation target data for, to activate the plurality of copying processes;

simultaneously carrying out the plurality of copying processes;

queueing, upon receipt of a data access request for accessing the copy-source volume overlapping the region of the copying process, being set the activation target data for, the data access request; and after copying data stored in the region of the copy-source volume, the region being to be accessed at the data access request, into the copy-destination volume, dequeueing the data access request and accessing data corresponding to the data access request.

6. The non-transitory computer-readable medium according to claim 5, the control further comprises, at a timing of executing a polling which the timing is asynchronous to the activation instruction, cancelling the stand-by state of a plurality of the copying processes, being set the activation target data for, to activate the plurality of copying processes and simultaneously causing the copy processor to carry out the plurality of copying processes.

* * * * *